US012002604B2

(12) United States Patent
Conway

(10) Patent No.: US 12,002,604 B2
(45) Date of Patent: Jun. 4, 2024

(54) POWER CABLE WHICH REDUCES SKIN EFFECT AND PROXIMITY EFFECT

(71) Applicant: TE Connectivity Solutions GmbH, Schaffhausen (CH)

(72) Inventor: Bruce Raymond Conway, Freemont, CA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 0 days.

(21) Appl. No.: 18/190,162

(22) Filed: Mar. 27, 2023

(65) Prior Publication Data

US 2023/0230722 A1 Jul. 20, 2023

Related U.S. Application Data

(62) Division of application No. 17/315,816, filed on May 10, 2021, now Pat. No. 11,640,861.

(51) Int. Cl.
*H01B 7/00* (2006.01)
*H01B 7/30* (2006.01)
*H01B 9/00* (2006.01)

(52) U.S. Cl.
CPC ............. *H01B 7/303* (2013.01); *H01B 9/006* (2013.01)

(58) Field of Classification Search
CPC ........ H01B 7/303; H01B 13/02; H01B 5/104; H01B 7/30; H01B 3/18; H01B 9/006
See application file for complete search history.

(56) References Cited

U.S. PATENT DOCUMENTS 5,110,999 A * 5/1992 Barbera ............. H01B 11/1091 174/113 C
6,225,565 B1 5/2001 Prysner
6,506,971 B1 * 1/2003 Grach ...................... H01B 7/30 174/32
10,008,307 B1 6/2018 Lanoe et al.
2002/0047268 A1 * 4/2002 Leijon .................... H02H 3/025 290/7
2010/0307811 A1 12/2010 Griffin
2012/0292075 A1 11/2012 Wallmeier et al.
2013/0037323 A1 * 2/2013 Smith ...................... H01B 7/36 174/75 R
2013/0341065 A1 * 12/2013 Sato ................... H01B 11/1895 174/107
2014/0284073 A1 * 9/2014 Kim ....................... H01B 7/041 174/115
2016/0173829 A1 6/2016 Olsson et al.
2018/0053582 A1 2/2018 Koeppendoerfer et al.
2018/0156848 A1 6/2018 Ospina Ramirez et al.
2019/0237219 A1 8/2019 Lethellier et al.
2020/0317070 A1 10/2020 Fuhrer
2020/0335242 A1 10/2020 Caperon

FOREIGN PATENT DOCUMENTS

JP H08321220 A 12/1996

OTHER PUBLICATIONS

International Search Report, International Application No. PCT/IB2022/054291, International Filing Date, May 9, 2022.

* cited by examiner

*Primary Examiner* — Pete T Lee

(57) ABSTRACT

A power cable having a central ground conductor. Phase interweave power conductors are positioned about the central ground conductor. Individual phase interweave power conductors have the same diameter. The individual phase interweave power conductors have a cross sectional area which is optimized. Each of the individual phase interweave power conductors is configured to support 100% cross sectional usage to maximize power carrying capability. The power cable reduces the skin effect of the power cable and the proximity effect of the power cable.

20 Claims, 2 Drawing Sheets

POWER CABLE WHICH REDUCES SKIN EFFECT AND PROXIMITY EFFECT

CROSS REFERENCE TO RELATED APPLICATIONS

This application is a Divisional of and claims priority to U.S. application Ser. No. 17/315,816 filed on May 10, 2021 which is incorporated herein by reference in its entirety.

FIELD OF THE INVENTION

The invention is directed to a cable which has individual conductors arranged to reduce or eliminate skin effect and proximity effect.

BACKGROUND OF THE INVENTION

In standard Litz constructions, individual strands are insulated from each other and are then bundled together. The original intent was to minimize electrical skin effect in RF coils in early radio thereby increasing available signal strength. In order to use Litz wires for power, the gauge of the strands remains small (30 to 40 AWG) and the strand count is greatly increased. This creates two major deficiencies. First, the insulated strands tend to short together over time, destroying the countering effect to skin effect. Second, to terminate traditional Litz wire each and every strand mist be terminated at both ends by either butt soldering or chemically stripping the insulation and crimping. Both of the termination methods are unreliable.

It would, therefore, be beneficial to provide a power cable which has a plurality of individual conductors which are configured to support 100% cross sectional usage to maximize power carrying capability, to allow known termination techniques, such as soldering or crimping, to be used. In would also be beneficial to provide a power cable which has a plurality of individual conductors which are configured to reduce or eliminate the skin effect of the power cable and the proximity effect of the power cable.

SUMMARY OF THE INVENTION

The following provides a summary of certain illustrative embodiments of the present invention. This summary is not an extensive overview and is not intended to identify key or critical aspects or elements of the present invention or to delineate its scope.

The power cable of the present invention allows the gauge size of the conductors to be maximized to support 100% cross sectional usage for current conduction, thereby allowing conventional termination techniques, such as soldering or crimping.

The power cable of the present invention allows for a much more robust construction than traditional Litz construction by eliminating the delicate strand to strand insulation of the Litz construction.

The power cable of the present invention use of a phase interweave, coupled with an external shield and placement of a central conductor ground references allows the electrical proximity effect to be canceled.

An embodiment is directed to a power cable having an outer shell and a plurality of individual conductors. The plurality of individual conductors are positioned in the outer shell. The individual conductors have a cross sectional area which is optimized. The individual conductors have the same diameter and each individual conductor is configured to support 100% cross sectional usage to maximize power carrying capability. The diameter of the individual conductors is proximate to, but below, the skin effect cutoff diameter of the individual conductors.

An embodiment is directed to a power cable having a shield referenced to a system ground potential and multiple individual phase interweave power conductors. The multiple individual phase interweave power conductors have a phase interweave which cancels the electrical proximity effect.

An embodiment is directed to a power cable having a central ground conductor. Phase interweave power conductors are positioned about the central ground conductor. Individual phase interweave power conductors have the same diameter. The individual phase interweave power conductors have a cross sectional area which is optimized. Each of the individual phase interweave power conductors is configured to support 100% cross sectional usage to maximize power carrying capability. The power cable reduces the skin effect of the power cable and the proximity effect of the power cable.

Additional features and aspects of the present invention will become apparent to those of ordinary skill in the art upon reading and understanding the following detailed description of the illustrative embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more illustrative embodiments of the invention and, together with the general description given above and detailed description given below, serve to explain the principles of the invention, and wherein.

DETAILED DESCRIPTION OF THE INVENTION

Figure 1:
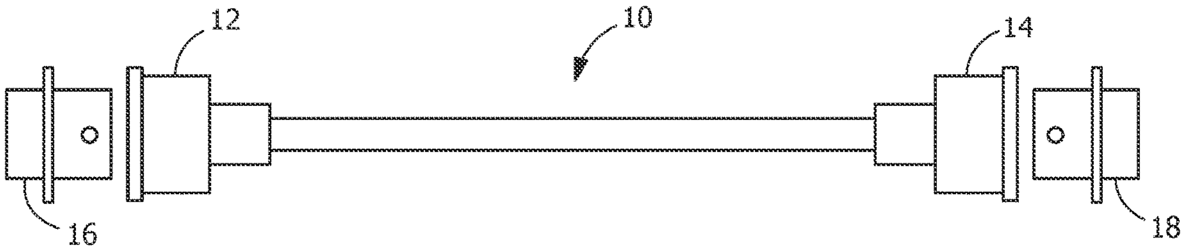
FIG. 1 is a diagrammatic view of an application in which the power cable is used.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached,"

"affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Illustrative embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

As shown in FIG. 1, a power cable 10 has connectors 12, 14 at either end. The power cable 10 is used to provide an electrical interconnection between components 12, 14. The configuration shown in FIG. 1 is meant to be illustrative, as the cable 10 of the present invention can be used in many varied application. Examples include, but are not limited to: airspace industry, providing power to turbines for aircraft; rail industry, providing power from the converters to the motor; and automotive industry, providing power from the batteries in electric vehicles to the motor.

Figure 2:
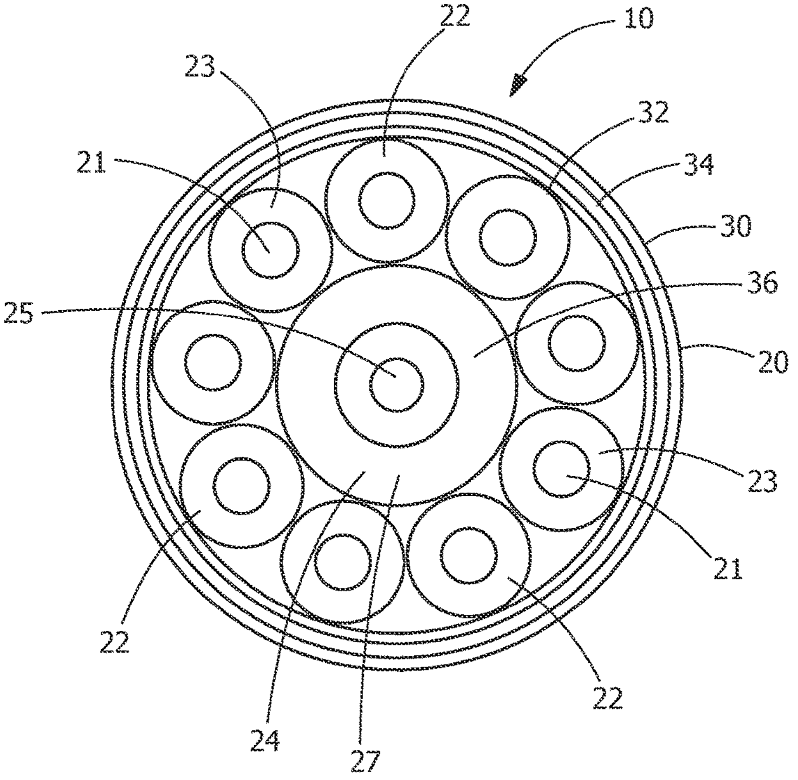
FIG. 2 is an enlarged cross sectional view of the cable taken along line 2-2 of FIG. 1.

As shown in the cross sectional view of the cable 10 in FIG. 2, the cable 10 includes an external shield or shell 20, a plurality or multiple individual phase interweave power conductors 22 and a central conductor 24. In the illustrative embodiment shown, nine individual phase interweave power conductors 22 are positioned around the circumference of the central conductor 24, but other configurations may be used.

The shell 20 includes an outer insulative sleeve 30, an inner insulative sleeve 32 and a conductive member 34 provided between the outer insulative sleeve 30 and the inner insulative sleeve 32. The conductive member 34 may be a braided member which is configured to be provided in electrical engagement with the system ground potential. However, other types of known shell 20 which provide a ground path may be used.

The central conductor 24 is an individual wire with an insulative jacket or coating. The central conductor 24 is a ground reference which is configured to be provided in electrical engagement with the system ground potential. The gauge or size of the central conductor 24 is dependent upon the size of the multiple individual phase interweave power conductors 22 and the amount of current the power cable 10 is rated to carry.

A filler 36 may be provided about the circumference of the central conductor 24. The filler 36 is made from insulative material and is configured to provide the proper spacing between the central conductor 24 and the plurality or multiple individual phase interweave power conductors 22. The filler 36 may be an extrusion over the central conductor 24. However, other types of fillers 36 may be used.

The power conductors 22 are individual wires with an insulative jacket or coating. The gauge or size of each of the individual power conductors 22 is dependent upon the amount of current the power cable 10 is designed or rated to carry. Each of the individual power conductors 22 is configured to have the same size or gauge as the other individual power conductors 22.

For a three phase system, there is at least one power conductor 22 per phase with the number of power conductors 22 increasing in multiples of three, to carry more current. In the illustrative embodiment shown in FIG. 2, the power cable 10 has nine power conductors 22 with three being fed by each phase in the system.

The size or gauge of the power conductors 22 is chosen such that the diameter of each of the power conductors 22 is proximate to, but just below or less than, the skin effect cutoff diameter for the maximum operating frequency of the power cable 10. The individual power conductors 22 have a cross sectional area which is configured to support 100% cross sectional usage to maximize power carrying capability of the power conductors 22 and the power cable 10. This allows the gauge of the power conductors 22 to be optimized to carry the desired power, while having a large enough diameter to allow for the use of existing termination techniques, such as, but not limited to, soldering or crimping.

The power conductors 22 are arranged to have a phase interweave. Examples of desired phase interweaves for power cable 10 with nine power conductors 22 include, but are not limited to, 1,2,3-2,3,1-3,1,2 or 1,2,3-1,2,3-1,2,3 or 1,2,1-2,3,2-3,1,3, where: 1 represents current carrying lines carrying current in the first phase; 2 represents current carrying lines carrying current in the second phase; and 3 represents current carrying lines carrying current in the third phase. The interweave allows that, for any given conductor, if the preceding phase is lagging, the subsequent phase is always leading. This allows the proximity effect in the power conductors 22 to be minimized or canceled, thereby minimizing the effective resistance of each of the power conductors 22.

By maximizing the gauge size of the power conductors 22 to just support 100% cross sectional usage for current conduction, conventional termination techniques are possible by soldering or crimping. This creates a much more robust Litz construction as compared to known Litz construction, as the delicate strand to strand insulation present with known Litz construction is eliminated. In addition, the overall cross section for current carrying path associated with the power conductors 22 of the power cable 10 is reduced when compared to known Litz construction, as the bulk associated with individual strand wise insulation is eliminated.

By use of the power conductors 22 and the phase interweave, coupled with the grounded external shield or shell 20 and placement of the grounded central conductor 24, the electrical proximity effect is canceled. This allows the effective resistance of the power cable 10 to be reduced compared to known power cables in which the proximity effect is not canceled or addressed.

For example, in a nine power conductor 22 power cable 10 with a ground central conductor 24 (10 AWG) and a grounded shell 20 (10 mil of perfluoroalkoxy (PFA) insulation) which is rated for a 3 KHz power feed, the individual conductors 22 are configured to have a nominal diameter of 0.130 inches (10 AWG) to accommodate 55 amps per conductor 22.

Figure 3:
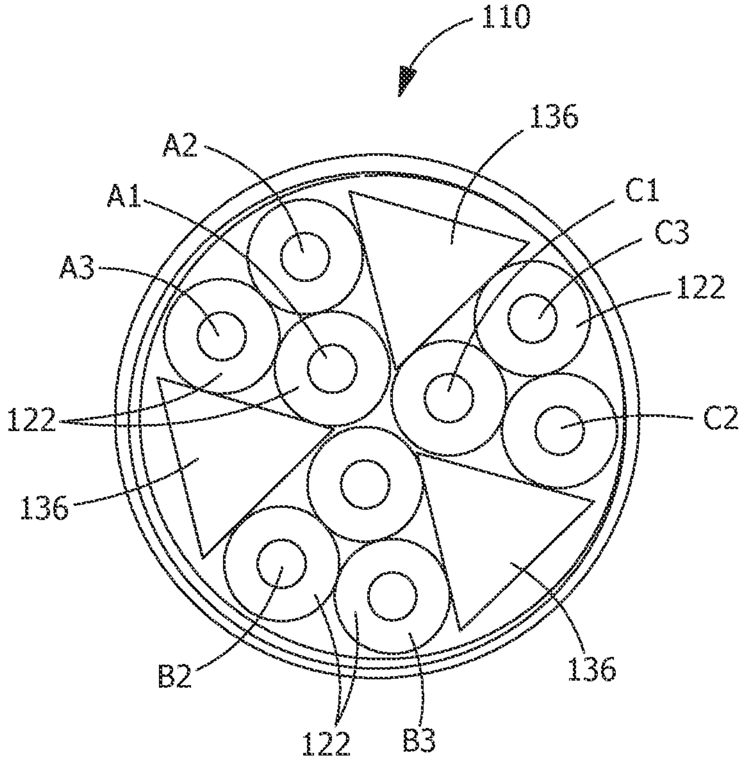
FIG. 3 is a cross sectional view of an alternate embodiment of the cable.
Figure 4:
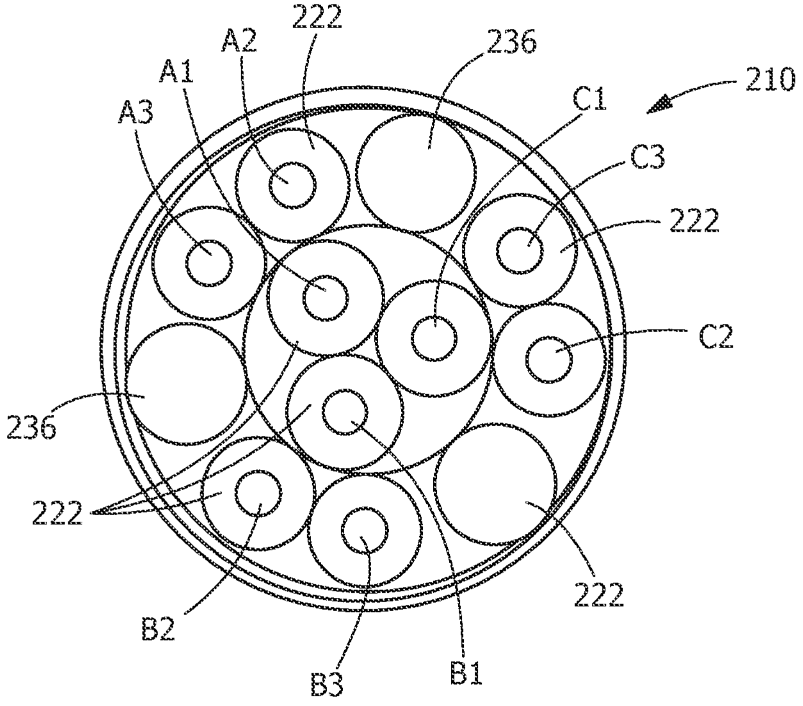
FIG. 4 is a cross sectional view of another alternate embodiment of the cable.

Alternate illustrative embodiments are shown in FIGS. 3 and 4. FIG. 3 is an illustrative embodiment of a power cable 110 with a triangular phase grouping of the power conductors 122 with infinite parent cable lay with the power conductors 122 laid straight along the length of the power cable 110, with no rotation. The power cable 110 may or may not include a central ground reference conductor.

In this illustrative embodiment, the power cable 110 has nine power conductors 122 with three being fed by each phase in the system. The size or gauge of the power conductors 122 is chosen such that the diameter of each of the power conductors 122 is proximate to, but just below or less than, the skin effect cutoff diameter for the maximum operating frequency of the power cable 110. The individual power conductors 122 have a cross sectional area which is configured to support 100% cross sectional usage to maximize power carrying capability of the power conductors 122 and the power cable 110. This allows the gauge of the power conductors 122 to be optimized to carry the desired power, while having a large enough diameter to allow for the use of existing termination techniques, such as, but not limited to, soldering or crimping.

The power conductors 122 are arranged in a triangular arrangement with triangular groupings of power conductors 122 spaced by triangular fillers 136 positioned between. An example of a desired arrangement of the power conductors 122 for a power cable 110 with nine power conductors 122 includes, but is not limited to, phase 1 conductors include A1, B3, C2, phase 2 conductors include B1, A2, C3, and phase 3 conductors include C1, B2, A3. This arrangement allows the proximity effect in the power conductors 122 to be minimized, thereby minimizing the effective resistance of each of the power conductors 122.

FIG. 4 is another illustrative embodiment of a power cable 210 with a triangular phase grouping of the power conductors 222 with an inner ring layer and an outer ring layer having counter rotating lays. The inner ring layer, comprising A1, B1, C1, has a left hand rotation. infinite parent cable lay. The outer ring layer, comprising A2, A3, B2, B3, C2, C3, has a right hand rotation.

In this illustrative embodiment, the power cable 210 has nine power conductors 222 with three being fed by each phase in the system. The size or gauge of the power conductors 222 is chosen such that the diameter of each of the power conductors 222 is proximate to, but just below or less than, the skin effect cutoff diameter for the maximum operating frequency of the power cable 210. The individual power conductors 222 have a cross sectional area which is configured to support 100% cross sectional usage to maximize power carrying capability of the power conductors 222 and the power cable 210. This allows the gauge of the power conductors 222 to be optimized to carry the desired power, while having a large enough diameter to allow for the use of existing termination techniques, such as, but not limited to, soldering or crimping.

The power conductors 222 are arranged in a triangular arrangement with triangular groupings of power conductors 222 spaced by round fillers 236 positioned between. An example of a desired arrangement of the power conductors 122 for a power cable 110 with nine power conductors 122 includes, but is not limited to, phase 1 conductors include A1, B3, C2, phase 2 conductors include B1, A2, C3, and phase 3 conductors include C1, B2, A3. As the inner layer counter rotates relative to the outer layer, the phase positions changes along the length of the power cable 10, allowing the proximity effect in the power conductors 222 to be minimized or canceled, thereby minimizing the effective resistance of each of the power conductors 222.

Other illustrative embodiments may include, but are not limited to: variations on the grouping or separation of the power conductors based on the number of power conductors used; other phase interweave patterns for each of the multiple groupings; individual shielding options for each of the groupings; and/or replacing the left or right cable twisting with conductor braid arrangements, with or without a woven in ground reference in each braid group.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A power cable comprising:

an outer shell;

a plurality of individual power conductors positioned in the outer shell, the individual power conductors having a cross sectional area which is optimized wherein the individual power conductors have the same diameter and each individual conductor being configured to support 100% cross sectional usage to maximize power carrying capability;

wherein the individual power conductors of the plurality of individual power conductors are arranged in phase groupings with fillers provided between the phase groupings;

wherein the diameter of each of the individual power conductors of the individual power conductors is proximate to, but below, the skin effect cutoff diameter of the respective individual power conductor of the individual power conductors for the maximum operating frequency of the power cable;

wherein the individual power conductors reduce the skin effect; and wherein the individual power conductors are arranged in a phase interweave, the phase interweave cancels the electrical proximity effect, minimizing the effective resistance of each of the individual power conductors.

2. The power cable as recited in claim 1, wherein the outer shell is grounded.

3. The power cable as recited in claim 1, wherein the fillers are insulative fillers.

4. The power cable as recited in claim 3, wherein for a three phase power system, the groupings of the individual power conductors include at least one power conductor for each phase.

5. The power cable as recited in claim 1, wherein the individual power conductors are nine individual power conductors.

6. The power cable as recited in claim 5, wherein the phase interweave has a 1,2,3-2,3,1-3,1,2, configuration, where: 1 represents current carrying lines carrying current in the first phase; 2 represents current carrying lines carrying current in the second phase; and 3 represents current carrying lines carrying current in the third phase wherein for any given power conductor, if the preceding phase is lagging, the subsequent phase is always leading.

7. The power cable as recited in claim 5, wherein the phase interweave has a 1,2,3-1,2,3-1,2,3 configuration, where: 1 represents current carrying lines carrying current in the first phase; 2 represents current carrying lines carrying current in the second phase; and 3 represents current carrying lines carrying current in the third phase wherein for any given power conductor, if the preceding phase is lagging, the subsequent phase is always leading.

8. The power cable as recited in claim 5, wherein the phase interweave has a 1,2,1-2,3,2-3,1,3 configuration, where: 1 represents current carrying lines carrying current in the first phase; 2 represents current carrying lines carrying current in the second phase; and 3 represents current carrying lines carrying current in the third phase wherein for any given power conductor, if the preceding phase is lagging, the subsequent phase is always leading.

9. The power cable as recited in claim 1, wherein the individual power conductors are arranged in triangular phase groupings.

10. The power cable as recited in claim 9, wherein the individual power conductors are laid straight along the length of the power cable, with no rotation.

11. The power cable as recited in claim 10, wherein the triangular phase groupings of the individual power conductors are spaced by fillers.

12. A power cable comprising:

an outer shell;

a plurality of individual power conductors positioned in the outer shell, the individual power conductors having a cross sectional area which is optimized wherein the individual power conductors have the same diameter and each individual conductor being configured to support 100% cross sectional usage to maximize power carrying capability;

wherein the individual power conductors have an inner ring layer and an outer ring layer, the inner ring layer and the outer ring layer having counter rotating layers;

wherein the diameter of each of the individual power conductors of the individual power conductors is proximate to, but below, the skin effect cutoff diameter of the respective individual power conductor of the individual power conductors for the maximum operating frequency of the power cable;

wherein the individual power conductors reduce the skin effect; and wherein the individual power conductors are arranged in a phase interweave, the phase interweave cancels the electrical proximity effect, minimizing the effective resistance of each of the individual power conductors.

13. The power cable as recited in claim 12, wherein the inner layer ring has a left hand rotation and the outer layer ring has a right hand rotation.

14. The power cable as recited in claim 12, wherein the plurality of individual power conductors are individual power conductors arranged in triangular phase groupings.

15. The power cable as recited in claim 14, wherein the triangular phase groupings of the individual power conductors are spaced by fillers.

16. A power cable comprising:

a shield referenced to a system ground potential;

multiple individual phase interweave power conductors;

individual phase interweave power conductors of the multiple individual phase interweave power conductors having a cross sectional area which is optimized wherein the individual phase interweave power conductors have the same diameter and each individual phase interweave power conductor being configured to support 100% cross sectional usage to maximize power carrying capability;

wherein the individual phase interweave power conductors of the plurality of individual phase interweave power conductors are arranged in phase groupings with fillers provided between the phase groupings;

wherein the diameter of each of the individual phase interweave power conductors is proximate to, but below, the skin effect cutoff diameter of the a respective individual phase interweave power conductor for the maximum operating frequency of the power cable;

wherein the multiple individual phase interweave power conductors having a phase interweave which cancels the electrical proximity effect.

17. The power cable as recited in claim 16, wherein a central ground conductor referenced to the system ground potential is provided, the multiple individual phase interweave power conductors positioned about the central ground conductor.

18. The power cable as recited in claim 16, wherein the phase groupings are triangular phase groupings.

19. The power cable as recited in claim 18, wherein the multiple individual phase interweave power conductors are laid straight along the length of the power cable, with no rotation.

20. The power cable as recited in claim 16, wherein the multiple individual phase interweave power conductors have an inner ring layer and an outer ring layer, the inner ring layer and the outer ring layer having counter rotating layers.

* * * * *